Patented Apr. 1, 1947

2,418,309

UNITED STATES PATENT OFFICE 2,418,309

CHROMIUM OXIDE CATALYST AND ITS METHOD OF PREPARATION

Maryan P. Matuszak, Bartlesville, Okla., and Glen H. Morey, Terre Haute, Ind., assignors to Phillips Petroleum Company, a corporation of Delaware No Drawing. Application June 4, 1942, Serial No. 445,817

16 Claims. (Cl. 252—210)

This invention relates to the catalytic treatment of hydrocarbons. It relates further to catalysts for use in catalytic processes and it has particular relation to catalysts that contain chromium oxide in substantial amount and that have been prepared by the thermal decomposition of ammonium-containing salts of chromic acid. This application is a continuation-in-part of our copending application, Serial No. 173,708, filed November 9, 1937, which issued as Patent No. 2,294,414.

Catalysts consisting of or containing chromium oxide have been found useful in various catalytic processes. One method of preparing chromium oxide-containing catalysts has been the ignition of ammonium-containing salts of chromic acid. For example, Lazier in a number of United States patents (for example, Nos. 1,746,783; 1,964,000; 1,964,001; 2,019,419) has described the preparation of catalysts by the heating of a double chromate of a nitrogen base such as ammonia and a hydrogenating metal such as zinc, manganese, copper, nickel, and the like. Heretofore, however, the ignition conditions have not been considered to be of particular significance and therefore have not been subjected to definite control, with the consequence that the chromium oxide formed in this manner simultaneously underwent englowing or calorescence, and thereby certain desirable properties were unwittingly destroyed in the catalyst. Thus, if a double chromate of ammonia and a hydrogenating metal is heated to a temperature at which a spontaneous exothermic decomposition takes place, in accordance with the teaching of the Lazier patents, generally at a temperature between about 200° and 400° C., there results an evolution of sufficient heat to leave a glowing residue. The resulting glowed or caloresced residue is noncoherent or finely divided and powdery in texture and therefore must generally be compressed or briquetted into suitable form for use. It consists substantially of the at least partially chemically combined oxides of chromium and of the hydrogenating metal of the original double salt in the form of a chromite, the chromium having been substantially completely reduced by the spontaneous decomposition from the hexavalent state present in chromates and dichromates to the trivalent state present in chromites. The spontaneous decomposition is generally very rapid and is always complete within a few minutes or at most within an hour or so, and not infrequently it proceeds, as in the cases of ammonium chromate and ammonium dichromate, with explosive violence.

Chromium oxide catalysts prepared by ignition of ammonium dichromate have been described by Lazier and Vaughan in an article, "The Catalytic Properties of Chromium Oxide," published in the Journal of the American Chemical Society, Vol. 54, August, 1932, pp. 3080–3095. The ignition resulted in the formation of a fluffy oxide having a tea-leaf appearance and exhibiting erratic catalytic behavior when tested for the hydrogenation of ethylene. It was non-homogeneous, as evidenced by the presence of particles of different colors, that is, dark-colored particles which appeared to possess some catalytic activity and bright green particles which were apparently completely inactive. The green particles, whose formation appeared to be favored by ignition in deep layers, did not exhibit the glow phenomenon but the dark and active material glowed feebly when heated to 500° C. The best product obtained in this way by Lazier and Vaughan was prepared by warming one-gram portions of ammonium dichromate in a thin layer over a flame until ignition was initiated. The resulting oxide was granulated by briquetting. A 20-cc. portion of this best product, when tested at 400° C. with a 7-liter sample of an equimolar hydrogen-ethylene mixture passed over the catalyst in an hour, or at a space velocity of about 350, gave a conversion of 80 per cent of the ethylene into ethane. In preparing another sample of catalyst, Lazier and Vaughan heated ammonium dichromate in a vacuum at 200° to 250° C. for 4 or 5 hours. The product was a glistening black residue which contained no ammonia, was slightly paramagnetic, and was stable at temperatures up to 400° C., but when further heated it suddenly glowed, leaving a light green residue without catalytic activity for ethylene hydrogenation. A 20-cc. portion of the unglowed material, when tested at 400° C. with a 7-liter sample of an equimolar hydrogen-ethylene mixture passed over the catalyst in an hour, caused a conversion of 25 per cent of the ethylene into ethane. A similar portion, which had undergone glowing by being heated in a vacuum to 500° C., gave a conversion of only 3 per cent.

Such catalysts prepared by ignition of ammonium-containing salts of chromic acid have found considerable application in reaction such as the synthesizing of methanol from oxides of carbon and hydrogen. They have also found limited application in the hydrogenation of certain organic materials and in the dehydrogenation of alcohols to aldehydes. But although these chromium oxide-containing catalysts have been more or less satisfactory for the conversion of oxygenated organic compounds such as alcohols and the oxides of carbon, they have been inferior or inadequate for the conversion of certain organic compounds such as hydrocarbons. For this reason, they have been generally unsuited for the conversion of hydrocarbons by changing their carbon-to-hydrogen ratios and particularly so for the dehydrogenation of paraffin hydrocarbons into mono-olefins of the same number of carbon atoms. This inadequacy is well illustrated by the aforementioned conversion figures obtained by Lazier and Vaughan when they are compared with thermodynamic data. Thus, if equilibrium had been attained under the stated conditions of temperature and gaseous composition, a conversion of 99 per cent of the ethylene to ethane should have been obtained whereas a maximum of only 80 per cent was actually reached, in spite of the fact that the relatively low space velocity used was very favorable for the attainment of equilibrium.

Our aforementioned copending application (Patent No. 2,294,414) discloses slow thermal decomposition of ammonium-containing salts of chromic acid under such controlled temperature conditions that spontaneous or explosive decomposition does not occur. Such nonspontaneous decomposition leads to the preparation of chromium oxide-containing catalysts that are definitely superior to the catalysts of the prior art in catalytic and mechanical properties, especially for the treatment and/or conversion of hydrocarbons at relatively low temperatures. The residue from such slow, controlled and nonspontaneous thermal decomposition, after being subjected to a controlled reduction retains its form and appearance at elevated temperatures, and is not readily subject to the glow phenomenon, which destroys the catalytic activity of such materials. For example, in the case of the nonspontaneous thermal decomposition of crystalline ammonium salts of chromic acid, the product is a porous but dense and coherent and fairly hard pseudocrystalline or crystallomorphous granular residue retaining the apparent or gross crystalline shape of the original ammonium salt. The salt granules or crystals shrink appreciably during the nonspontaneous decomposition, and the product retains a small proportion of ammonia and of water derived from oxidation of a part of the ammonium in the original salt. The total chromium oxide of the residue has an approximate empirical formula of $CrO_2$, indicating that the chromium is, either actually or on the average, in a tetravalent state. The presence of chromium having a valence greater than three is readily observable by dissolving a portion of the catalyst in hot dilute sulfuric acid, cooling, and adding potassium iodide, whereupon iodine is liberated. Under the same conditions, trivalent chromium does not cause any liberation of iodine.

Among the objects of the present invention is to effect the catalytic conversion of hydrocarbons. Another object is to provide an improved process for the preparation of catalysts. A specific object is to prepare catalysts comprising a granular support and unglowed chromium oxide. Another specific object is to conserve time in the preparation of such catalysts. Another object is to conduct catalytic processes promoted by such catalysts.

Other objects and advantages of this invention will be apparent from the accompanying description and discussion.

In accordance with the present invention, a catalyst is prepared by depositing one or more ammonium-containing salts of chromic acid in and/or on a relatively less catalytically active solid, granular porous carrier or support and decomposing the salts under controlled conditions, hereinafter described in detail, to produce a granular catalytic material comprising unglowed chromium oxide. In the resulting catalyst, the highly active catalytic chromium oxide is advantageously diluted by the relatively less active or inert carrier, so that it is highly resistant to mechanical and thermal shocks. As the size and shape of the carrier granules determine the size and shape of the granules of the ultimate catalyst, no attention need be paid to the procurement of large and/or well-formed crystals of the original salt of chromic acid; small or poorly shaped crystals serve equally as well as large and well-formed ones. The quantity of chromium-containing salt or salts, which are quite expensive, is only a fraction of that necessary to produce the same volume of an unsupported catalyst. Somewhat unexpectedly, in view of the fact that crystals of an ammonium-containing salt of chromic acid shrink appreciably upon being nonspontaneously decomposed, the catalytic material adheres remarkably well to the support; this desirable adherence may be accounted for on the theory that, under the conditions described, the deposited salt forms tangled masses of minute crystals that are interlocked to some extent with irregularities and pores in the surface of the support; however, such theory should not be construed as a limitation of the invention.

In one preferred embodiment of the invention, a concentrated solution of an ammonium-containing salt of chromic acid, such as ammonium chromate, ammonium dichromate, ammonium trichromate, a double chromate of ammonium and one or more metals, or the like, is mixed with a suitable granular carrier material. The solution is preferably hot, to increase the concentration of dissolved salt, and it may be saturated. The resulting mixture is dried to remove water, and heated in a reducing atmosphere to effect a controlled decomposition of the chromate and a concomitant reduction of the resulting chromium oxide.

The carrier may, in general, be any solid granular porous material that is capable of withstanding elevated temperatures, up to about 750° or 800° C., and the conditions present during revivification of the catalyst by an oxygen-containing gas at an elevated temperature. Particularly desirable are minerals capable of withstanding hydrocarbon-dehydrogenation temperatures without mechanical failure and possessing not only high specific surface and porosity but also ready perviousness. Supports having these characteristics are obtainable from hydrous minerals, often especially hydrous crystalline minerals such as gypsum, gibbsite, and the like, by heating them to drive out combined water, so that a pervious skeleton structure of the mineral itself remains. Certain metamorphosed minerals, such as mica and its relatives and various clays having a somewhat stratified structure, such as bentonite and montmorillonite, may be used as supports; those having good porosity and perviousness may be readily selected by simple test for these characteristics. Among preferred carriers are alumina, bauxite, magnesia, thoria, and zirconia; kieselguhr, silica gel, and the like may also be used. These supports are not to be considered as being complete equivalents of each other; they may or may not possess catalytic activity of their own. Of these materials, alumina and bauxite are highly satisfactory, especially hard bauxite, such as that found as pebbles in the region around Bauxite, Arkansas; such bauxite has an exceptionally high resistance to abrasion and an exceptionally good catalytic activity per se for the treatment of hydrocarbons, and it is less expensive, all things being considered, than most of the other carriers mentioned. The carrier, in the form of granules of any desired size, is preferably heated before use to a temperature of about 500° or 600° C. to expel volatile matter and to increase its porosity. Extraneous soluble or finely divided matter may be advantageously removed by washing with water, preferably after the preliminary heating to expel volatile matter; a preliminary chemical treatment, such as treatment with an acid or an alkali to remove undesired constituents, such as an acid treatment to remove iron, is also sometimes advantageous. A carrier having certain exceptional advantages is alumina manufactured in the form of pills of definite and uniform size and shape. Because of the uniform size and shape, undesired packing and/or channeling in the catalyst bed during use is minimized. By suitable control during manufacture, these alumina pills are made of advantageously uniform and relatively low density and uniform and relatively high porosity and perviousness.

The carrier granules may be of any desired size and shape; a size within the range of 4 to 20 mesh is preferred. The size may be outside of this preferred range, but if it is much smaller than about 40-mesh, the mixture comprising carrier and chromium-containing salt or oxide is preferably put into the form of relatively large composite granules, as by briquetting, pelleting, or the like. When the afore-mentioned alumina pills are used, the carrier preferably is in the form of approximate or true cylinders about one-eighth of an inch both in diameter and in length.

The weight ratio of carrier material to chromium oxide may vary from about 2 to 20 or more; usually the optimum ratio is in the range of about 5 to 15. With very high proportions of carrier material, catalytic activity may be undesirably diluted, whereas with very low proportions, the incorporation of the oxide with the carrier may be difficult.

The impregnation of the carrier with the ammonium containing salt of chromic acid may be aided by the use of a vacuum to remove pocketed gas from the granular support and by maintaining a low pressure while mixing the support and the solution; subsequent release of the vacuum causes the solution to be driven into the interstices of the support. Similarly, alternate heating and cooling may be used to drive the solution into the support. Also, the impregnated granules may be partly or wholly dried and reimpregnated as many times as may be desired or necessary to incorporate the desired proportion of salt in and on the carrier.

After being dried to remove water, the impregnated support is subjected to conditions under which the ammonium-containing salt of chromic acid is slowly and controllably decomposed. In order that the decomposition may not become of the spontaneous character, which we have found to be undesirable and harmful to the catalytic and physical properties of the product, it is essential that the temperature during decomposition be not permitted to exceed about 225° or 230° C. We prefer to carry out the decomposition at temperatures not exceeding about 200° C., since thereby the danger of spontaneous or explosive decomposition is minimized. But it is not desirable to use temperatures much below 175° C., since such lower temperatures needlessly prolong the decomposition period. This is illustrated by the experimental facts that in the nonspontaneous decomposition of a sample of ammonium dichromate in air in an electric oven kept at 200° C. a minimum hexavalent chromium content of 32 per cent of the total chromium was reached in a period of about 15 hours, whereas when the oven was kept at 175° C. this period became about 11 days. For these reasons it is advantageous and preferable to carry out the decomposition at temperatures between 175° and 200° C. It is possible, however, to decompose successfully ammonium salts of chromic acid at temperatures somewhat above this preferred range, up to about 225° or 230° C., if all conditions are favorable; but generally it is felt that the gain in shortening the period of nonspontaneous decomposition does not compensate for the increase danger of occurrence of the undesired spontaneous decomposition and its attendant destruction of mechanical strength and catalytic activity. In general the decomposition is carried out at an elevated temperature that is not more than approximately 75° C. below the temperature at which said salt decomposes with incandescence.

Whether or not the chromium oxide of the residue obtained by the nonspontaneous thermal decomposition in air is truly tetravalent, as the empirical formula $CrO_2$ implies, is not definitely known by us. We prefer to consider that the residue has a composition that may be expressed by the formula $Cr_2O_3.CrO_3$, which has the same ratio of chromium to oxygen as $CrO_2$ and which implies that two thirds of the chromium is trivalent and that one third is hexavalent. Because of this preference and because of its convenience, we shall herein refer to the chromium of higher valence than three which is present in the residue from the nonspontaneous thermal decomposition as being hexavalent, it being understood that we do not otherwise limit ourselves. Such hexavalent chromium may be determined by dissolving it from a weighed portion of the catalyst with an excess of hot dilute sulfuric acid, suitably about 5 to 10 per cent in strength, boiling if necessary for 20 or 30 minutes to effect dissolution, then cooling, adding an excess of potassium iodide, and titrating the liberated iodine with a thiosulfate solution of known strength, suitably 0.1 normal, with starch being used as indicator.

It is possible so to conduct the nonspontaneous decomposition that such hexavalent chromium lies in the range of 25 to 40 per cent of the total chromium, and preferably in the range of 30 to 35 per cent. When the heating is continued in an oxidizing atmosphere such as air, the content of hexavalent chromium as defined herein becomes a minimum and then slowly increases again. For example, in the aforementioned case of the decomposition of ammonium dichromate in air at 200° C., in which a minimum hexavalent-chromium content of 32 per cent of the total chromium was reached in 15 hours, it was found that after a total of 45 hours the content of hexavalent chromium had increased to slightly over 40 per cent of the total chromium. Again, in the also aforementioned case of the decomposition of ammonium dichromate in air at 175° C., in which a minimum hexavalent-chromium content of 32 per cent of the total chromium was reached in 11 days, the hexavalent chromium became 35 per cent of the total chromium after a total period of 14 days. We have found that a content of hexavalent chromium in excess of approximately 35 per cent of the total chromium is undesirable and disadvantageous because there exists a pronounced tendency of the oxide or oxides of such hexavalent chromium, which appear to be formed on continuing the heating in an oxidizing atmosphere beyond the minimum content of hexavalent chromium, to undergo a spontaneous thermal decomposition which causes a destruction of mechanical strength and catalytic activity. For example, if a preparation containing such hexavalent chromium is heated to a sufficiently high temperature, such as a temperature of about 300° C. or more, the higher oxides decompose, sometimes with explosive violence, and the product is markedly inferior as a catalyst for dehydrogenation of paraffin hydrocarbons to the corresponding mono-olefins and likewise for hydrogenation reactions.

To avoid the reoxidation which has just been described and to produce an especially active catalyst we have found that it is preferable to carry out the controlled and nonspontaneous thermal decomposition in a reducing atmosphere. We have found that we can successfully decompose ammonium dichromate and ammonium chromate in atmospheres of hydrogen, ammonia, or carbon monoxide, preferably hydrogen. However, great care must be exercised that heat liberated by the reduction, which is highly exothermic, does not raise the temperature high enough to cause spontaneous thermal decomposition of the still unreduced oxides of hexavalent chromium. This procedure appears to be highly successful apparently because the individual particles of the ammonium-containing salt of chromic acid are comparatively small crystals, because the carrier "dilutes" the salt, and/or because the carrier has an appreciable capacity for absorbing heat. To make a successful outcome doubly certain, however, we generally prefer to dilute the reducing gas, such as hydrogen, carbon monoxide, or the like, with an inert monoxidizing and nonreducing gas of high molar heat, such as carbon dioxide, because such gas efficiently absorbs the heat liberated by any incipient spontaneous decomposition and thus minimizes or inhibits the tendency for such undesirable spontaneous decomposition to occur or to continue. The dilution may be to any desire extent, such as, for example, with an equal volume of the inert gas, or more.

The time required for the nonspontaneous thermal decomposition and reduction depends upon the temperature. We have hereinbefore cited the lengths of representative periods at the two extremes of the preferred range of 175° to 200° C. Within this preferred range a generally suitable period of time for carrying out the controlled and nonspontaneous thermal decomposition may be found by adding to a period of 15 hours an additional period of 10 hours for every degree centigrade that the temperature used lies below 200° C. At lower temperatures such as in the range 150° to 175° C., the period would be of the order of two weeks or more and at higher temperatures (up to about 230° C.) it would be of the order of several hours or less, depending on the extent that the temperature used differed from the preferred range. Completion of reduction can be readily determined by means that are well known to workers in the art, as by determining if water is being formed or by determining if any hydrogen is being consumed. Analyses of the oxide content may also be used for control purposes. If desired, proper temperature control during the decomposition and/or the reduction may be facilitated by spreading the catalyst in a thin layer on a metallic plate or plates over which flows the selected reducing atmosphere.

In similar manner we may use mixed or double salts of chromic acid, to prepare chromium oxide-containing catalysts having as other constituents one or more metals or oxides of metals. An especially suitable form of such salts is that representable by the general formula

$(NH_4)_2M(CrO_4)_2$ in which M is a divalent metal, such as barium, cadmium, calcium, cobalt, copper, magnesium, nickel, zinc, or the like. Such salts are usually advantageously crystallizable as diammoniates having two molecules of ammonia of crystallization, e. g., $(NH_4)_2CrO_4.CaCrO_4.2NH_3$ and $(NH_4)_2CrO_4.CuCrO_4.2NH_3$, or as hexahydrates having six molecules of water of crystallization, e. g., $(NH_4)_2CrO_4.MgCrO_4.6H_2O$ and

$(NH_4)_2CrO_4.CaCrO_4.6H_2O$ but well-formed crystals are not ordinarily essential to the practice of the present invention. Many other ammonium-containing salts of chromic acid may also be used; a few examples are:

$(NH_4)_2CrO_4.(NH_4)_6.Mo_7O_{24}.4H_2O$ $2(NH_4)_2O.V_2O_5.2CrO_3.7H_2O$ $(NH_4)_2CrO_4.2VO_2.CrO_4.6H_2O$ and $NH_4O.CrO_2O.Cr.O.Cr.O_2ONH_4$. The last of these, ammonium chromochromate, may be considered to be a specific salt of the foregoing general formula, wherein M is divalent chromium.

After complete reduction, the resulting catalyst possesses a high catalytic efficiency for reactions such as dehydrogenation, nondestructive hydrogenation, desulfurization, and cyclization and/or dehydrocyclization of hydrocarbons, and the like. It can be used as a catalyst at all temperatures at which the conversion is thermodynamically high enough to be desirable or profitable, such as temperatures within the range 200° to 700° C. Any carbonaceous deposit formed on it during use can be burned off with air under suitable temperature conditions without destruction of its catalytic activity, and it can thereafter be used again. Furthermore, it can be repeatedly used and reactivated without undergoing the glow phenomenon or calorescence that may accompany or follow the spontaneous decomposition of ammonium salts of chromic acid or which may often be induced in other chromium oxide-containing preparations by heating to a temperature above about 400° or 500° C.

Some of the aspects of the invention are further illustrated by the following examples.

EXAMPLE I

In 85 cc. of water, which was found to be just sufficient to cover 100 grams (119 cc.) of ⅛-inch cylindrical pellets of alumina, was dissolved 16.6 grams of ammonium dichromate, which is the equivalent of 10 grams of chromic oxide ($Cr_2O_3$). The solution was added to 100 grams of the alumina pellets, and the resulting mixture was heated gently on an electric hot plate with stirring, until it appeared almost dry. The partly dried mixture was further dried for several days in a stream of dry air in an oven at about 50° to 60° C. A portion of the resulting dried dichromate-impregnated pellets was placed in a catalyst chamber and was heated in air at 200° C. for 24 hours, whereby the ammonium dichromate was nonspontaneously decomposed. This portion was then treated with hydrogen at 200° C. until reduction was complete. Then the temperature was increased to about 530° C., and a stream of normal butane at atmospheric pressure was established at a space velocity of 1000 volumes per volume of catalyst per hour. The temperature was automatically adjusted to maintain a practically constant conversion of 30 per cent of the butane to butylene, and the length of the dehydrogenation cycle until the temperature reached 601° C. was determined from automatic records of the conversion and the temperature. For ease of comparison with similar data from other examples, the length of the dehydrogenation cycle is given in the table. After the run, the catalyst was revivified with air during about an hour, during which the general temperature was allowed to drop to about 530° C., and it was reduced with hydrogen at this temperature. It was then used for a second dehydrogenation cycle, the length of which is also given in the table.

EXAMPLE II

A portion of the dried pellets impregnated with undecomposed ammonium dichromate, prepared in Example I, was heated in a stream of hydrogen from room temperature to 180° C. in about 3 hours, and was kept under these conditions for 9 days. Then the temperature was raised, and the catalyst was tested for the dehydrogenation of normal butane under the same conditions as those of Example I. The lengths of the first and the second dehydrogenation cycles are given in the table.

EXAMPLE III

Alumina pellets were impregnated and dried as in Example I except that 20 grams of ammonium chromate was used instead of 16.6 grams of ammonium dichromate. A portion was treated to nonspontaneous decomposition and subsequent reduction as in Example I, and was tested for the dehydrogenation of normal butane under the same conditions as those of Example I. The lengths of the first and the second dehydrogenation cycles are given in the table.

EXAMPLE IV

A portion of the dried pellets impregnated with undecomposed ammonium chromate, prepared in Example III, was heated in a stream of hydrogen to 175° C. and was kept at this temperature for 12 hours; then it was heated to 200° C. and was kept at this temperature for about a day. Then the temperature was raised, and the catalyst was tested for the dehydrogenation of normal butane under the same conditions as those of Example I. The lengths of the first and the second dehydrogenation cycles are given in the table.

EXAMPLE V

A portion of the dried pellets impregnated with undecomposed ammonium chromate, prepared in Example III, was heated in a stream of hydrogen from room temperature to 212° C. in about 4 hours, and was kept at this temperature for 10 hours. Then the temperature was raised, and the catalyst was tested for the dehydrogenation of normal butane under the same conditions as those of Example I. The lengths of the first and the second dehydrogenation cycles are given in the table.

TABLE
*Dehydrogenation of normal butane*

| Example | Salt | Reduction | Cycle 1, min. | Cycle 2, min. |
|---|---|---|---|---|
| I | Dichromate | Subsequent | 137 | 131 |
| II | ...do | Simultaneous | 162 | 141 |
| III | Chromate | Subsequent | 110 | 108 |
| IV | ...do | Simultaneous | 143 | 123 |
| V | ...do | ...do | 145 | 174 |

Among other things, it will be noted from the data of the table that all the catalysts were highly active; that the dichromate catalyst was generally active for a somewhat longer cycle than the chromate catalyst; and that, for both catalysts, reduction simultaneous with nonspontaneous decomposition was more advantageous than reduction subsequent to decomposition.

EXAMPLE VI

The catalyst of Example V, after being used for the second dehydrogenation cycle of that example, was revivified and was used for the dehydrogenation of normal butane at a practically constant temperature automatically controlled at 600° C. The conversion of butane to butylene averaged 36 per cent during the first hour; in a second run, it averaged 35 per cent.

For the sake of being able to make direct comparisons we have limited our specific illustrative examples to the dehydrogenation of normal butane. Thus we have been able to show that we can reproduce our results consistently, and that we can produce similar results using different modifications. Catalysts prepared in the manner herein disclosed may be used for the dehydrogenation of many other paraffin hydrocarbons, from ethane through heavy oils and waxes. Thus, paraffinic motor fuels such as straight-run gasoline may be improved in combustion characteristics by being subjected to treatment with such catalysts. Such catalysts are also valuable in the production of cyclo-olefin and aromatic hydrocarbons, such as in the formation of benzene from cyclohexane or from normal hexane, of toluene from normal heptane, and the like. The production of diolefins from olefins, of styrene from ethylbenzene, and the like, may also be accomplished by the use of these catalysts.

These catalysts are also quite efficient in promoting the addition of hydrogen to unsaturated linkages between carbon atoms, and especially in the nondestructive addition of hydrogen to olefin hydrocarbons. They are further efficient because they are not readily poisoned by the usual poisons for nondestructive hydrogenation catalysts. In fact, we have found that in the case of the most common poison, sulfur, our catalysts may be used for desulfurizing organic materials by converting the organic sulfur contained therein substantially completely into hydrogen sulfide, which can then be removed by well-known means, as by an alkali wash. They may also be used for the production of hydrogen from steam and carbon monoxide and for other reactions known for this type of catalytic material.

Mention has often been made herein that the chromium oxide or oxides in the most desirable residue from the controlled and nonspontaneous thermal decomposition of ammonium-containing chromates or polychromates has an empirical formula which closely approximates $CrO_2$, and it has been shown that this may be further represented by a simple mixture or combination of chromium oxides such as $Cr_2O_3.CrO_3$. For this reason, and as a matter of convenience, the chromium with a valence higher than three has been spoken of as a certain amount of hexavalent chromium, and a method for determining this higher-valent chromium has been given. The true chemical formula of the residue has not been definitely established; but it is immaterial whether the higher-valent chromium is considered as being truly tetravalent as in $CrO_2$, or as being partly truly hexavalent and partly truly trivalent, as in $Cr_2O_3.CrO_3$, since the chemical formula has no bearing on the invention other than as discussed herein. Therefore, any mention made herein or in the claims which follow of hexavalent chromium in chromium oxide or of chromium oxide of any particular content of hexavalent chromium, is to be considered in the light of this discussion and disclosure.

The product from the nonspontaneous thermal decomposition has the same apparent or gross shape or physical form as the original crystals or granules of ammonium-containing salt of chromic acid deposited on and in the carrier or support. It is probable, but not definitely known, that the atoms in the product are definitely arranged and spaced and thus in this respect resemble the atoms in a true crystal; this may possibly contribute to the high catalytic efficiency of the product.

Because the invention may be practiced otherwise than as specifically described herein, and because many modifications of it will be obvious to those skilled in the art, it should not be restricted except as specified in the appended claims.

What is claimed is:

1. A process of preparing an improved chromium oxide catalyst, which comprises impregnating a solid granular carrier with a solution of an ammonium-containing salt of chromic acid, drying the impregnated carrier, and subjecting the dried impregnated carrier to controlled heating in a reducing atmosphere at an elevated temperature below the temperature at which said salt decomposes with incandescence, to effect nonspontaneous decomposition of said salt and concomitant reduction of chromium oxide, and continuing said treatment until said decomposition and reduction is substantially complete, to form a black, unglowed chromium oxide having a ratio of Cr to $O_2$ corresponding substantially to the empirical formula $CrO_2$.

2. A process as defined in claim 1, in which said reducing atmosphere comprises free hydrogen as the main reducing constituent.

3. A process as defined in claim 1, in which said reducing atmosphere comprises a reducing constituent and an inert gas of high molar heat.

4. A process as defined in claim 1, in which said reducing atmosphere comprises a reducing constituent and carbon dioxide.

5. A process as defined in claim 1, in which said salt comprises at least one metal other than the chromium in said chromic acid.

6. A process as defined in claim 1, in which the composition of said salt is substantially representable by the general formula $(NH_4)_2M(CrO_4)_2$, in which M is a divalent metal.

7. A process as defined in claim 1, in which said salt is an ammonium salt of chromic acid.

8. A process as defined in claim 1, in which said salt is ammonium dichromate.

9. A process as defined in claim 1, in which said salt is ammonium chromate.

10. A process as defined in claim 1, in which said carrier is bauxite.

11. A process as defined in claim 1, in which said carrier is pelleted alumina.

12. An improved catalyst suitable for use in the treatment of hydrocarbon materials at elevated temperatures, which comprises reduced, unglowed chromium oxide on a solid granular pervious support prepared by the steps which comprise impregnating a solid pervious granular supporting material with a solution of an ammonium-containing salt of chromic acid, drying the impregnated material at a temperature such that extensive decomposition of said salt does not take place, and subjecting the material so dried and in a reducing atmosphere to a temperature in the range of 175° to 225° C. and such that appreciable spontaneous decomposition of said salt is obviated and such that nonspontaneous decomposition and concomitant reduction of chromium oxide to a lower chromium oxide takes place for a time such that substantially complete decomposition and reduction is affected, to form a black, unglowed chromium oxide having a ratio of Cr to $O_2$ corresponding substantially to the empirical formula $CrO_2$.

13. A process of preparing an improved chromium oxide catalyst, which comprises impregnating a solid granular carrier material with a solution of an ammonium-containing salt of chromic acid, drying the impregnated carrier, and subjecting the dried impregnated carrier to controlled heating in a reducing atmosphere at an elevated temperature that is not more than approximately 75° C. below the temperature at which said salt decomposes with incandescence, to effect nonspontaneous decomposition of said salt and concomitant reduction of chromium oxide, and continuing said treatment until said decomposition and reduction is substantially complete, to form a black, unglowed chromium oxide having a ratio of Cr to $O_2$ corresponding subtantially to the empirical formula $CrO_2$.

14. A process of producing an improved chromium oxide catalyst, which comprises impregnating a solid granular carrier material with a solution of an ammonium-containing salt of chromic acid, drying the impregnated carrier, and subjecting the dried impregnated carrier to controlled heating in a reducing atmosphere at an elevated temperature within the range of approximately 175° to approximately 225° C. to effect nonspontaneous decomposition of said salt and concomitant reduction of chromium oxide, and continuing said treatment until said decomposition and reduction is substantially complete, to form a black, unglowed chromium oxide having a ratio of Cr to $O_2$ corresponding substantially to the empirical formula $CrO_2$.

15. A process of preparing an improved chromium oxide catalyst, which comprises impregnating a solid granular carrier with a solution of an ammonium-containing salt of chromic acid, drying the impregnated carrier, and subjecting the dried impregnated carrier to controlled heating in a reducing atmosphere comprising hydrogen at a temperature within the range of approximately 175° to approximately 225° C., to effect nonspontaneous decomposition of said salt and concomitant reduction of chromium oxide, and continuing said treatment until said decomposition and reduction is substantially complete, to form a black, unglowed chromium oxide having a ratio of Cr to $O_2$ corresponding substantially to the empirical formula $CrO_2$.

16. A process of producing an improved chromium oxide catalyst, which comprises impregnating a solid granular carrier material with a solution of an ammonium-containing salt of chromic acid, drying the impregnated carrier, and subjecting the dried impregnated carrier to controlled heating in a reducing atmosphere at an elevated temperature within the range of approximately 175° to approximately 200° C., to effect nonspontaneous decomposition of said salt and concomitant reduction of chromium oxide, and continuing said treatment for such period that the elapsed time of heating is 15 hours plus an additional 10 hours for every degree centigrade that said elevated temperature is below 200° C., to form a black, unglowed chromium oxide having a ratio of Cr to $O_2$ corresponding substantially to the empirical formula $CrO_2$.

MARYAN P. MATUSZAK.
GLEN H. MOREY.

REFERENCES CITED

The following references are of record in the file of this patent:

UNITED STATES PATENTS

| Number | Name | Date |
|---|---|---|
| 1,210,367 | Reynolds | Dec. 26, 1916 |
| 1,964,000 | Lazier | June 26, 1934 |
| 2,183,591 | Schulze | Dec. 19, 1939 |
| 2,217,865 | Groll et al. | Oct. 15, 1940 |
| 2,249,337 | Visser et al. | July 15, 1941 |
| 2,294,414 | Matuszak | Sept. 1, 1942 |
| 2,167,650 | Grosse | Aug. 1, 1939 |
| 1,789,538 | Beekley | Jan. 20, 1931 |
| 2,205,141 | Heard | June 18, 1940 |

OTHER REFERENCES

Lazier et al., "The Catalytic Properties of Chromium Oxide," Journal of Am. Chem. Soc., vol. 54, Aug. 1932, pp. 3080–3095.

---

Certificate of Correction

Patent No. 2,418,309.　　　　　　　　　　　　　　　　　　　April 1, 1947.

MARYAN P. MATUSZAK ET AL.

It is hereby certified that errors appear in the printed specification of the above numbered patent requiring correction as follows: Column 7, line 51, for "monoxidizing" read nonoxidizing; column 8, line 28, for that portion of the formula reading "$CaCrO_4$" read $CdCrO_4$; column 8, line 43, for that portion of the formula reading "$Cr.O_2ONH_4$" read $CrO_2.ONH_4$; and that the said Letters Patent should be read with these corrections therein that the same may conform to the record of the case in the Patent Office.

Signed and sealed this 1st day of July, A. D. 1947.

[SEAL]

LESLIE FRAZER,
*First Assistant Commissioner of Patents.* mately 175° to approximately 225° C., to effect nonspontaneous decomposition of said salt and concomitant reduction of chromium oxide, and continuing said treatment until said decomposition and reduction is substantially complete, to form a black, unglowed chromium oxide having a ratio of Cr to $O_2$ corresponding substantially to the empirical formula $CrO_2$.

16. A process of producing an improved chromium oxide catalyst, which comprises impregnating a solid granular carrier material with a solution of an ammonium-containing salt of chromic acid, drying the impregnated carrier, and subjecting the dried impregnated carrier to controlled heating in a reducing atmosphere at an elevated temperature within the range of approximately 175° to approximately 200° C., to effect nonspontaneous decomposition of said salt and concomitant reduction of chromium oxide, and continuing said treatment for such period that the elapsed time of heating is 15 hours plus an additional 10 hours for every degree centigrade that said elevated temperature is below 200° C., to form a black, unglowed chromium oxide having a ratio of Cr to $O_2$ corresponding substantially to the empirical formula $CrO_2$.

MARYAN P. MATUSZAK.
GLEN H. MOREY.

REFERENCES CITED

The following references are of record in the file of this patent:

UNITED STATES PATENTS

| Number    | Name        | Date           |
|-----------|-------------|----------------|
| 1,210,367 | Reynolds    | Dec. 26, 1916  |
| 1,964,000 | Lazier      | June 26, 1934  |
| 2,183,591 | Schulze     | Dec. 19, 1939  |
| 2,217,865 | Groll et al.| Oct. 15, 1940  |
| 2,249,337 | Visser et al.| July 15, 1941 |
| 2,294,414 | Matuszak    | Sept. 1, 1942  |
| 2,167,650 | Grosse      | Aug. 1, 1939   |
| 1,789,538 | Beekley     | Jan. 20, 1931  |
| 2,205,141 | Heard       | June 18, 1940  |

OTHER REFERENCES

Lazier et al., "The Catalytic Properties of Chromium Oxide," Journal of Am. Chem. Soc., vol. 54, Aug. 1932, pp. 3080–3095.

---

Certificate of Correction

Patent No. 2,418,309.                                April 1, 1947.

MARYAN P. MATUSZAK ET AL.

It is hereby certified that errors appear in the printed specification of the above numbered patent requiring correction as follows: Column 7, line 51, for "monoxidizing" read nonoxidizing; column 8, line 28, for that portion of the formula reading "$CaCrO_4$" read $CdCrO_4$; column 8, line 43, for that portion of the formula reading "$Cr.O_2ONH_4$" read $CrO_2.ONH_4$; and that the said Letters Patent should be read with these corrections therein that the same may conform to the record of the case in the Patent Office.

Signed and sealed this 1st day of July, A. D. 1947.

[SEAL]

LESLIE FRAZER,
*First Assistant Commissioner of Patents.*